United States Patent [19]
Key et al.

[11] Patent Number: 4,946,188
[45] Date of Patent: Aug. 7, 1990

[54] WHEEL ALIGNMENT

[75] Inventors: Sammy D. Key; Martin T. Quintanilla, both of Brownfield, Tex.

[73] Assignee: Doreen Mason, Helena, Minn.

[21] Appl. No.: 421,553

[22] Filed: Oct. 12, 1989

[51] Int. Cl.$^5$ ............................................. B62D 17/00
[52] U.S. Cl. .................................... 280/661; 280/668
[58] Field of Search ................................ 280/661, 668

[56] References Cited

U.S. PATENT DOCUMENTS

| | | | |
|---|---|---|---|
| 4,213,631 | 7/1980 | Wilkerson | 280/661 |
| 4,817,984 | 4/1989 | Ferman et al. | 280/661 |
| 4,857,473 | 9/1989 | Jordan | 280/661 |

*Primary Examiner*—Kenneth R. Rice
*Attorney, Agent, or Firm*—Wendell Coffee

[57] ABSTRACT

An adjustment for a MacPherson strut of an automobile is provided by modifying the top bearing retainer to provide an inward circular lip. Two plates are clamped to this lip. Before clamping, the plates are rotatable relative to the bearing retainer so that the center of an eccentric hole therein moves along a circle which is concentric to the bearing retainer and thus the bearing. The upper end of the piston rod of the strut is mounted in the eccentric hole so that the position of the upper end of the strut can be moved relative to the body and also within the bearing and helical spring.

9 Claims, 2 Drawing Sheets

WHEEL ALIGNMENT

BACKGROUND OF THE INVENTION

(1) Field of the Invention

This invention relates to the automobile repair and maintenance and more particularly to front-wheel alignment for automobiles having MacPherson strut front-wheel suspension.

(2) Description of the Related Art

In recent years many, if not most, automobiles use a unit body. By this it is meant that the body of the automobile is also the frame of the automobile and the ground engaging wheels are supported by the body. In such a construction, the MacPherson strut has become widely used. The main support of the front wheel is the MacPherson strut which extends from the top of the wheel well (sometimes called the tower) to the stub shaft or spindle of the wheel. Many automobiles with the MacPherson struts have no means for adjusting the top of the strut in the event of mis-alignment which occurs as a result of wear or abuse of the vehicle. This problem has been recognized.

Wilkerson in U.S. Pat. No. 4,213,631 suggested as a solution that the automobile be manufactured with the strut attached to the body of the automobile at the top of the wheel well by a plate having four symmetrical bolt holes. The plate would have an eccentric hole to receive the top of the strut assembly including the spring. The plate could be attached in any one of four positions so that the hole and thus the top of the strut assembly could be moved to any one of the four positions. Another plate would be provided with a hole in another eccentric position and therefore it could be attached to adjust the plate in any one of four existing positions. The entire top of the strut assembly could be adjusted in any one of eight different positions by the use of one or the other plates.

Ferman et al, U.S. Pat. No. 4,817,984 discloses a design which has a plate which is clamped in place so that it can be rotated. Therefore, with an eccentric hole in the plate, the top of the strut assembly including spring can be rotated to any position along the circle described by the center of the eccentric hole as the plate is rotated.

Also at the time of filing this application, the applicants were aware of the following U.S. Pat. Nos.

4,026,578 : Mattson
4,733,884 : Pettibone
4,650,208 : Mason
4,618,162 : Specktor The applicants do not consider the above U.S. Patents to be as pertinent as the two specifically discussed above, however reference is made to them herein because it was believed that the examiner would consider them of interest.

SUMMARY OF THE INVENTION

(1) Progressive Contribution to the Art

We have discovered that a satisfactory alignment can be achieved by moving the top of the strut only within the top assembly. According to this invention, the thrust bearing at the top of the strut assembly as well as the spring at the top of the strut assembly, is not moved from the position it is placed at the time of manufacture. A plate to receive the upper piston rod of the strut has an eccentric hole. This plate can be clamped so that the eccentric hole may be positioned anywhere on a circle concentric with a modified bearing cap retainer. The required movement of the top of the strut is such that it can be accommodated within the inside dimensions of the helical coil springs surrounding the strut. Therefore, with modification of the one element, (the bearing cap retainer) and the providing of the plates and their clamping structure, an adjustment can be provided on the struts even though there was no provision for adjustment at the time the automobile was manufactured. Also it is important to note that there is no cutting or modification of the body itself. This is particularly important because of the necessity of maintaining the structural integrity of the body. It is recognized that any failure of the structure in this area can be disastrous.

(2) Objects of this Invention

An object of this invention is to align a wheel of an automobile suspended by a MacPherson strut.

Further objects are to achieve the above with devices that are sturdy, compact, durable, simple, safe, efficient, versatile, ecologically compatible, energy conserving, and reliable, yet inexpensive and easy to manufacture, install, adjust, and maintain.

Other objects are to achieve the above with a method that is safe, rapid, versatile, ecologically compatible, energy conserving, efficient, and inexpensive, and does not require highly skilled people to install, adjust, and maintain.

The specific nature of the invention, as well as other objects, uses, and advantages thereof, will clearly appear from the following description and from the accompanying drawing, the different views of which are not scale drawings.

As an aid to correlating the terms of the claims to the exemplary drawing, the following catalog of elements and steps is provided:

| | |
|---|---|
| 10. ground engaging wheel | 31. strut retainer |
| 12. spindle | 32. bearing retainer |
| 14. automobile body | 34. modified retainer |
| 16. strut assembly | 36. lip |
| 18. top of well | 38. plates |
| 20. cylinder member | 40. rod hole |
| 22. piston rod | 42. clamp bolt hole |
| 24. helical spring | 44. clamp bolt |
| 26. lower retainer | 46. rod nut |
| 28. bearing | 48. shoulder |
| 30. upper end or top | 50. rubber plates |

DESCRIPTION OF THE PREFERRED EMBODIMENT

Figure 1:
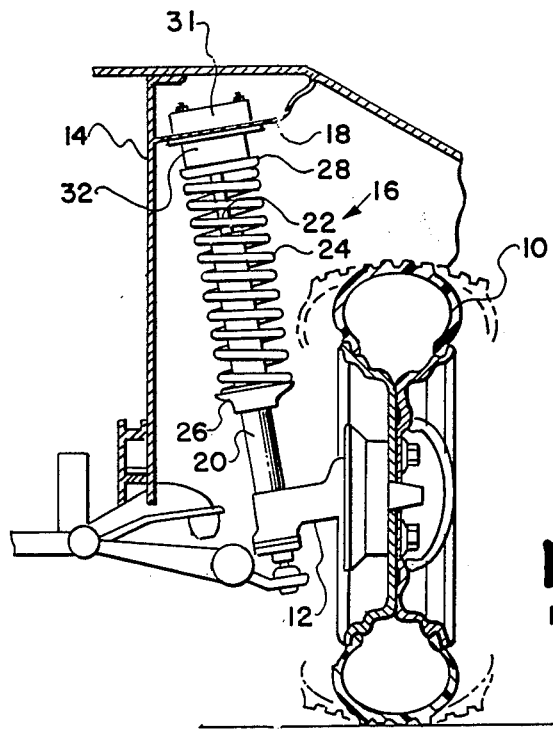
FIG. 1 is a front elevation schematic representation, partially in section, of a front wheel MacPherson strut suspension, according to the prior art.

Referring to the drawings and more particularly to FIG. 1, there may be seen representation of a wheel having a MacPherson strut. Specifically, ground engaging wheel 10 is journalled to spindle 12. The spindle 12 is connected to automobile body 14 by the conventional steering mechanisms and pivots. In addition the telescoping strut assembly 16 extends from the spindle 12 to the body 14 at top 18 of the wheel well. The strut assembly 16 includes lower cylinder member 20. Upper piston rod 22 is telescoped within the cylinder member 20. Normally there will be hydraulic fluid between the cylinder and the piston rod members to perform the shock absorption function of the strut.

Helical compression spring 24 extends from lower retainer 26 on the cylinder member to circular bearing 28 encircling the piston rod 22. The spring encircles the lower cylinder member 20 and upper piston rod 22 inasmuch as the lower retainer 26 is near the lower portion of the cylinder member 20. The piston rod 22 not only reciprocates within the cylinder member 20 but also it rotates therein. It will be understood that the cylinder member 20 turns with the spindle 12 as the front wheels of the automobile are steered in its normal operation. Also the spring 24 on the retainer 26 will turn with the spindle. This turning rotation is accommodated by the bearing 28.

The piston rod 22 is threaded at its upper end 30 thereby bolted to structure within circular bearing retainer 32. The bearing retainer is securely bolted to strut retainer 31 which is integral with the body 14 or is welded to the body 14. Therefore it may be seen that the bearing retainer 32 does not rotate nor does the piston rod attached thereto. The helical spring 24, circular bearing 28, bearing retainer 32, and strut retainer 31 are all concentric. At the time of manufacture the piston rod 22 and its top 30 are concentric with or at the axis of the circular bearing 28.

Those having ordinary skill in the art will recognize that the structure described to this point is old, well known and presently commercially on the market.

Figure 2:
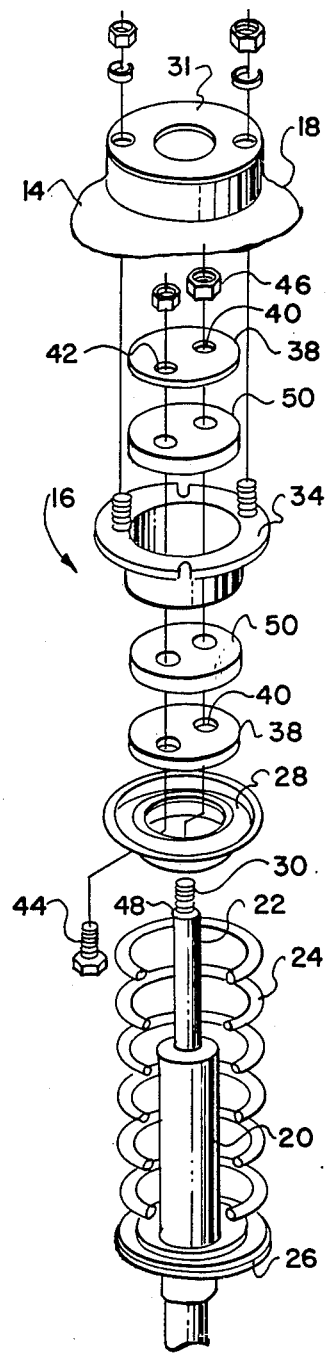
FIG. 2 is a top plan view of the upper bearing retainer, according to the prior art.

Also it will be understood that presently on many of the automobiles in operation today that the top or upper end 30 of the piston rod is attached by a bolt directly to a hole in a portion of the bearing retainer 32. (FIG. 2) Therefore it having this connection it is, as manufactured, fixed in one location and cannot be moved for the purpose of adjustment. It will be understood of course that the movement or the adjustment of the top 30 of the piston rod 22 accomplishes the camber and caster alignment of the wheel, as discussed in the Wilkerson and Ferman et al patents listed above.

Figure 3:
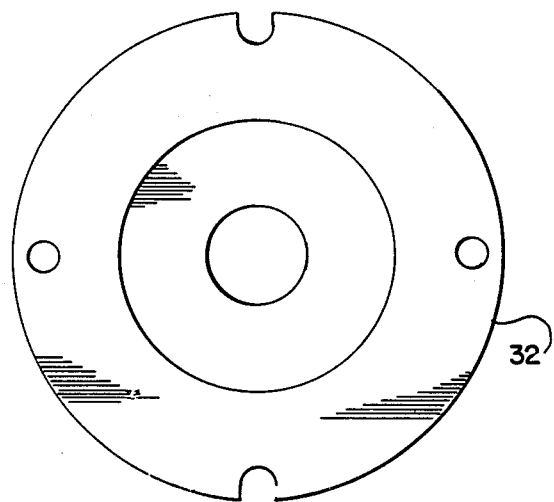
FIG. 3 is an exploded perspective view of a strut assembly according to this invention.
Figure 4:
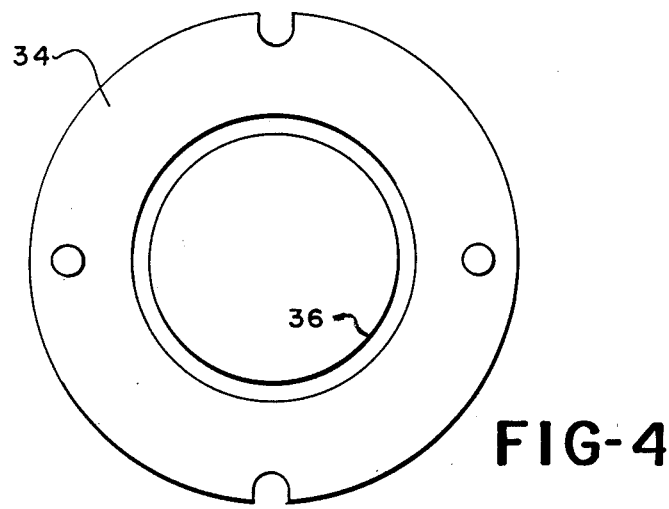
FIG. 4 is a top plan view of the upper bearing retainer according to this invention.
Figure 5:
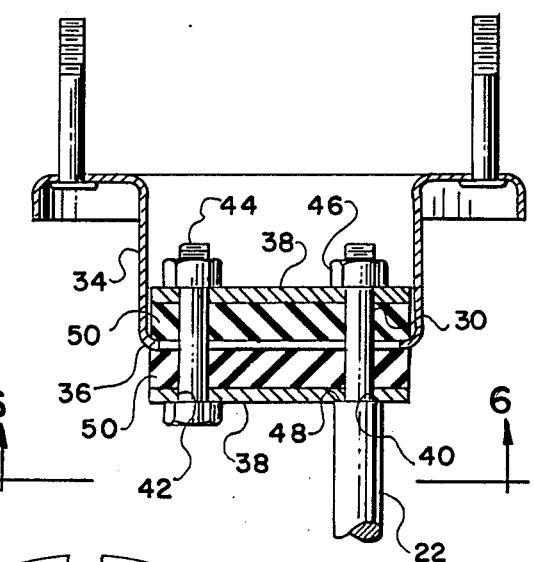
FIG. 5 is an axial sectional view of the upper bearing retainer with the piston rod connected thereto according to this invention, taken/substantially on line 5—5 of FIG. 6.

According to this invention, the bearing retainer 32 is modified so that it takes the form of modified retainer 34. (FIG. 3 and 4) This modification is to enlarge the single hole through the old retainer 32 so that there is an inward lip or flange 36 at the lower edge of the modified retainer 34. This inward flange or lip is concentric to the body of the modified retainer 34 which is cup shaped or cylindrical.

Two circular metal plates 38 are prepared. These metal plates 38 have an outside diameter slightly smaller than the inside diameter of the modified retainer 34 so that they fit snuggly therein yet may be rotated about their axis. One of the plates 38 is placed within the cup shaped modified retainer 34 and the other below it. The two plates 38 are identical in construction. Each will have rod hole 40 which is eccentrically located. Also each plate will have clamp bolt hole 42 by which clamp bolt 44 may be placed to clamp the two plates 38 together securely against the inward flange 36 of the modified retainer 34. When thus assembled the threaded top 30 of the piston rod 22 is inserted through the rod hole 40 and rod nut 46 tightens thereon so that the plates are also clamped by the rod nut 46 on top and shoulder 48 immediately below the threaded upper end 30 of the piston rod 22.

Figure 6:
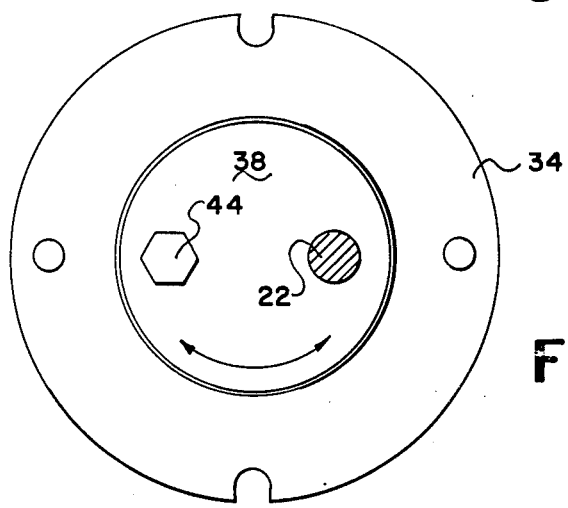
FIG. 6 is a view of the upper bearing retainer taken substantially on line 6—6 of FIG. 5.

Before the plates 38 are clamped together they may be rotated within the bearing retainer 34 so that the center of the rod hole 40 moves (see arrow FIG. 6) along a circle concentric with the bearing retainer 34, strut retainer 31, circular bearing 28, and helical spring 24.

It is preferred to provide two rubber plates 50 which are of identical diameter with identical location and size of holes as the metal plates 38. These rubber plates 50 are placed one between the lip 36 and the plate 38 within the cup shaped retainer 34 and the other between the lip 36 and the plate 38 below the retainer 34 . The rubber plates 50 facilitate the clamping of the metal plates 38 to the inward flange 36 of the modified retainer 34. As discussed in the prior art and particularly in the Wilkerson Patent and the Ferman et al patent noted above, that the rotation of the plates 38 will provide adjustment for either or both camber or caster.

We have found through experiment that normally one set of plates 38 and 50 will be sufficient to provide proper alignment for most automobiles. However those with skill in the art can understand that if either greater adjustment is needed or that if more exact adjustment is desired that the eccentricity of the rod holes 40 could be changed.

The embodiment shown and described above is only exemplary. We do not claim to have invented all the parts, elements or steps described. Various modifications can be made in the construction, material, arrangement, and operation, and still be within the scope of our invention.

The restrictive description and drawing of the specific example above do not point out what an infringement of this patent would be, but are to enable one skilled in the art to make and use the invention. The limits of the invention and the bounds of the patent protection are measured by and defined in the following claims.

I claim as my invention:
1. In an automobile having
   a. a ground engaging wheel attached to
   b. a body by
   c. a telescoping strut including
   d. a lower cylinder member and
   e. an upper piston rod partially telescoped in the cylinder member,
   f. the cylinder member attached to
   g. a spindle to which the wheel is journalled,
   h. the piston rod extending into
   i. a bearing retainer attached to the automobile body, and
   j. a helical compression spring surrounding telescoping strut and extending from
   k. a lower spring retainer on the cylinder member to
   l. a bearing encircling the piston rod,
   m. said bearing seated on said bearing retainer;

n. the improved structure connecting the piston rod and the bearing retainer comprising in combination:
o. plate means interconnecting the bearing retainer and piston rod for connecting the piston to the bearing retainer at any point along a circle concentric with the bearing.

2. In an automobile having
a. a ground engaging wheel attached to
b. a body by
c. a telescoping strut including
d. a lower cylinder member and
e. an upper piston rod partially telescoped in the cylinder member,
f. the cylinder member attached to
g. a spindle to which the wheel is journalled,
h. the piston rod extending into
i. a bearing retainer attached to the automobile body, and
j. a helical compression spring surrounding telescoping strut and extending from
k. a lower spring retainer on the cylinder member to
l. a bearing encircling the piston rod,
m. said bearing seated on said bearing retainer;
n. the improved structure connecting the piston rod and the bearing retainer comprising in combination:
o. at least one metal plate having
p. an eccentric hole therein,
q. means inner-connecting said plate and bearing retainer for clamping said plate to said bearing retainer, and
r. said piston rod attached within said eccentric hole.

3. The invention as defined in claim 2 further comprising:
s. another metal plate identical to said metal plate also clamped to said bearing retainer.

4. The invention as defined in claim 3 further comprising:
t. said bearing retainer having a circular inward flange, with two sides,
u. one of said plates on one side of the flange and the other said plate on the other side of the flange, so that rotation of the plates moves the center of the eccentric holes along a circle concentric to said inward flange, and
v. a bolt through the plates clamping the plates to the flange.

5. The invention as defined in claim 4 further comprising:
w. a rubber plate between each metal plate and said flange.

6. A process involving
a. an automobile having
b. a ground engaging wheel attached to
c. a body by
d. a telescoping strut including
e. a lower cylinder member and
f. an upper piston rod partially telescoped in the cylinder member,
g. the cylinder member attached to
h. a spindle to which the wheel is journalled,
i. the piston rod extending into
j. a bearing retainer attached to the automobile body, and k. a helical compression spring surrounding telescoping strut and extending from
l. a lower spring retainer on the cylinder member to
m. a bearing encircling the piston rod,
n. said bearing seated on said bearing retainer;
o. wherein the improved method of connecting the piston rod and the bearing retainer comprises:
p. attaching said piston rod to said bearing retainer at a selected point on a circle concentric with said helical spring, thereby
q. shifting the location of piston rod relative to the spring.

7. The invention as defined in claim 6 wherein said piston rod is attached to said bearing retainer by
r. clamping a plate having an eccentric hole therein to the retainer, and
s. attaching said piston rod in the eccentric hole of the plate.

8. A process involving
a. an automobile having
b. a ground engaging wheel attached to
c. a body by
d. a telescoping strut including
e. a lower cylinder member and
f. an upper piston rod partially telescoped in the cylinder member,
g. the cylinder member attached to
h. a spindle to which the wheel is journalled,
i. the piston rod extending into
j. a bearing retainer attached to the automobile body, and
k. a helical compression spring having an axis surrounding telescoping strut and extending from
l. a lower spring retainer on the cylinder member to
m. a bearing encircling the piston rod,
n. said bearing seated on said bearing retainer;
o. wherein the improved method of connecting the piston rod and the bearing retainer comprises:
p. attaching said piston rod to said bearing retainer at a selected point non-axially of said helical spring, thereby
q. shifting the location of piston rod relative to the spring.

9. In an automobile having
a. a ground engaging wheel attached to
b. a body by
c. a telescoping strut including
d. a lower cylinder member and
e. an upper piston rod partially telescoped in the cylinder member,
f. the cylinder member attached to
g. a spindle to which the wheel is journalled,
h. the piston rod extending into
i. a bearing retainer attached to the automobile body, and
j. a helical compression spring having an axis surrounding telescoping strut and extending from
k. a lower spring retainer on the cylinder member to
l. a bearing encircling the piston rod,
m. said bearing seated on said bearing retainer;
n. the improved structure connecting the piston rod and the bearing retainer comprising in combination:
o. means for connecting the piston to the bearing retainer at a distance from the helical spring axis.

* * * * *